United States Patent
Arizono et al.

(10) Patent No.: US 8,111,476 B2
(45) Date of Patent: Feb. 7, 2012

(54) DISK DRIVE SPIN CONTROL

(75) Inventors: Yukiko Arizono, Kanagawa (JP); Kazuyuki Ishibashi, Kanagawa (JP); Yoshikatsu Fujii, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/642,734

(22) Filed: Dec. 18, 2009

(65) Prior Publication Data

US 2010/0157463 A1 Jun. 24, 2010

(30) Foreign Application Priority Data

Dec. 18, 2008 (JP) ................... 2008-322245

(51) Int. Cl.
*G11B 15/46* (2006.01)
*G06F 1/32* (2006.01)
*G06F 13/10* (2006.01)

(52) U.S. Cl. ............ 360/73.03; 713/320; 713/711; 713/114

(58) Field of Classification Search .............. None
See application file for complete search history.

(56) References Cited

U.S. PATENT DOCUMENTS

| 5,682,273 | A  | * | 10/1997 | Hetzler ........................... 360/75 |
| 5,734,912 | A  | * | 3/1998  | Okuno et al. ................. 713/310 |
| 7,007,141 | B2 | * | 2/2006  | Li et al. .......................... 711/162 |
| 7,221,531 | B2 | * | 5/2007  | Duerk et al. .................... 360/69 |
| 7,404,035 | B2 | * | 7/2008  | Anzai et al. ................... 711/114 |
| 7,468,590 | B1 | * | 12/2008 | Krishnamoorthy et al. .. 318/268 |
| 7,853,809 | B2 | * | 12/2010 | Zhang et al. .................. 713/300 |
| 2009/0228674 | A1 | * | 9/2009 | Ouchi ........................... 711/168 |

FOREIGN PATENT DOCUMENTS

| JP | 08237976   | 9/1996 |
| JP | 2002032952 | 1/2002 |
| JP | 2002123338 | 4/2002 |
| JP | 2007156089 | 6/2007 |

* cited by examiner

*Primary Examiner* — K. Wong (57) ABSTRACT

A disk drive configured to control spindle spin is provided. The disk drive includes a spindle motor for spinning a disk configured for storing data, a nonvolatile memory comprising instructions associated with a first process for spin-up of the spindle motor from a power-on mode and the nonvolatile memory comprising instructions associated with a second process for spin-up of the spindle motor from a power save mode, a controller for determining which of the first or the second process for spin-up of the spindle motor to implement in accordance with the instructions stored in the nonvolatile memory and a motor driver for spinning up the spindle motor according to the first process or according to the second process for spin-up of the spindle motor.

14 Claims, 5 Drawing Sheets

| SPIN-UP START DELAY TIME | | | |
|---|---|---|---|
|  | HIGH PRIORITY | MIDDLE PRIORITY | LOW PRIORITY |
| POWER-ON | 0.0 SEC | 0.0 SEC | 0.0 SEC |
| STAND-BY | 0.0 SEC | 0.3 SEC | 0.6 SEC |
| LOW ROTATIONAL SPEED | 0.0 SEC | 0.3 SEC | 0.6 SEC |

(b)

| SPIN-UP START DELAY TIME | | | |
|---|---|---|---|
|  | HDD 1d | HDD 1e | HDD 1f |
| POWER-ON | 0.0 SEC | 0.0 SEC | 0.0 SEC |
| STAND-BY | 0.0 SEC | 0.3 SEC | 0.6 SEC |
| LOW ROTATIONAL SPEED | 0.0 SEC | 0.3 SEC | 0.6 SEC |

| SPIN-UP MODE | | | |
|---|---|---|---|
| | POWER-ON | STAND-BY | LOW ROTATIONAL SPEED |
| 2.0A CLIP | ○ | ○ | |
| 1.5A CLIP | | | ○ |
| DELAY TIME | 0.0 SEC | 0.3 SEC | 0.0 SEC |

FIG. 5

DISK DRIVE SPIN CONTROL

CROSS-REFERENCE TO RELATED APPLICATION

This application claims priority from the Japanese Patent Application No. 2008-322245, filed Dec. 18, 2008, the disclosure of which is incorporated herein in its entirety by reference.

TECHNICAL FIELD

The present invention relates to a disk drive and a disk array system, and more particularly, to spin-up of a spindle motor mounted in a disk drive.

BACKGROUND

Recently, either a solid state drive (SSD) or a hard disk drive (HDD) is chosen as a storage device depending on the application. The biggest advantage of the SSD is the fast data transfer rate. On the other hand, the cost per unit of capacity is high and the number of rewrites is limited. Thus, the HDD is superior to the SSD in some points. Therefore, it is expected that users will choose and use a HDD as a storage device if they need frequent access and large capacity.

SUMMARY

Embodiments of the present invention include A disk drive configured to control spindle spin is provided. The disk drive includes a spindle motor for spinning a disk configured for storing data, a nonvolatile memory comprising instructions associated with a first process for spin-up of the spindle motor from a power-on mode and the nonvolatile memory comprising instructions associated with a second process for spin-up of the spindle motor from a power save mode, a controller for determining which of the first or the second process for spin-up of the spindle motor to implement in accordance with the instructions stored in the nonvolatile memory and a motor driver for spinning up the spindle motor according to the first process or according to the second process for spin-up of the spindle motor.

DESCRIPTION OF THE DRAWINGS

The accompanying drawings, which are incorporated in and form a part of this specification, illustrate embodiments of the invention and, together with the description, serve to explain the embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for Disk Drive Spin Control In accordance with embodiments of the present invention staggered spin-up can be used to reduce the load on a system power supply in the spin-up of spindle motors from power-on. Specifically, on power-up of a plurality of HDDs connected together, a RAID controller selects HDDs to start spin-up sequentially. Since the spin-up timings of the HDDs are different, the peak current in the power-up is reduced, while the system startup is delayed.

Embodiments of the present invention change the startup method of a spindle motor for different purposes in an optical disk drive. Embodiments of the invention changes the startup current to a spindle motor for different purposes such as reduction of power consumption, reduction of startup time and faster access.

Power save modes are utilized in electronics to meet rising demand for reduced power consumption. The power save modes are called stand-by mode, sleep mode ant the like. In such power save modes, a HDD stops the rotation of the spindle motor in order to reduce the power consumption. Embodiments of the present invention modify the start-up speed of a spindle motor during waking from a sleep mode.

The present invention includes a disk drive that includes a spindle motor for spinning a disk for storing data, a nonvolatile memory for storing setting data for a spin-up mode of the spindle motor from power-on and setting data for a spin-up mode of the spindle motor from a power save mode, a controller for determining each of the spin-up modes from the power-on and the power save mode in accordance with the setting data stored in the nonvolatile memory, a motor driver for spinning up the spindle motor in a mode determined by the controller in each of the spin-up operations from the power-on and the power save mode. Embodiments of the present invention enable control of the spin-up of the spindle motor in the disk drive according to user needs and usage environment.

In one embodiment of the invention, a maximum spin-up current is settable in each of the spin-up mode from the power-on and the spin-up mode from the power save mode. Embodiments of the present invention enable setting properly the maximum current from the power source and the start-up time according to user needs. In one embodiment, a spin-up delay start time is defined in each of the spin-up mode from the power save mode and the spin-up mode from the power-on. The defined maximum current enables the drive to perform a process to control the maximum current in spin-up in a system with a plurality of disk drives.

In one embodiment, the controller reports the spin-up mode from the power-on and the spin-up mode from the power save mode to a host. The reported data enables the host to manage appropriately a plurality of disk drives. In one embodiment, the controller returns the disk drive from the power save mode in response to a command from a host. This ability enables controlling the power save mode according to the state of system.

In one embodiment of the invention, the disk drive includes a first power save mode in which the spindle motor is stopped and a second save mode in which the rotational speed of the spindle motor is reduced, and the controller determines the spin-up modes of the first power save mode and the second power save mode in accordance with preset data. The controller achieves appropriate power save control according to the system. In one embodiment, the disk drive includes a first power save mode in which the spindle motor is stopped and a second save mode in which the rotational speed of the spindle motor is reduced, and a spin-up mode determined by the controller in accordance with preset data is associated with the first power save mode and the second power save mode. It accomplishes simple settings.

One embodiment of the invention includes a disk array system comprising a plurality of disk drives, and a system controller for dividing user data and instructing the plurality of disk drives to store the divided user data. Each of the plurality of disk drives comprises a nonvolatile memory for storing setting data for a spin-up mode of the spindle motor from power-on and setting data for a spin-up mode of the spindle motor from a power save mode, a controller for determining each of the spin-up modes from the power-on and the power save mode in accordance with the setting data stored in the nonvolatile memory, a motor driver for spinning up the spindle motor in a mode determined by the controller in each of the spin-up operations from the power-on and the power save mode. It allows controlling the spin-up of the spindle motor in the disk drive according to user needs and usage environment.

A HDD of the present embodiment has a feature in spin-up control of a spindle motor. In the HDD, a spin-up mode from power-on and a spin-up mode from a power save mode are both settable. These settable spin-up modes accomplish a HDD with an appropriate setting to the power condition of the system. The HDD of the present embodiment is suitable for a disk array system.

Figure 1:
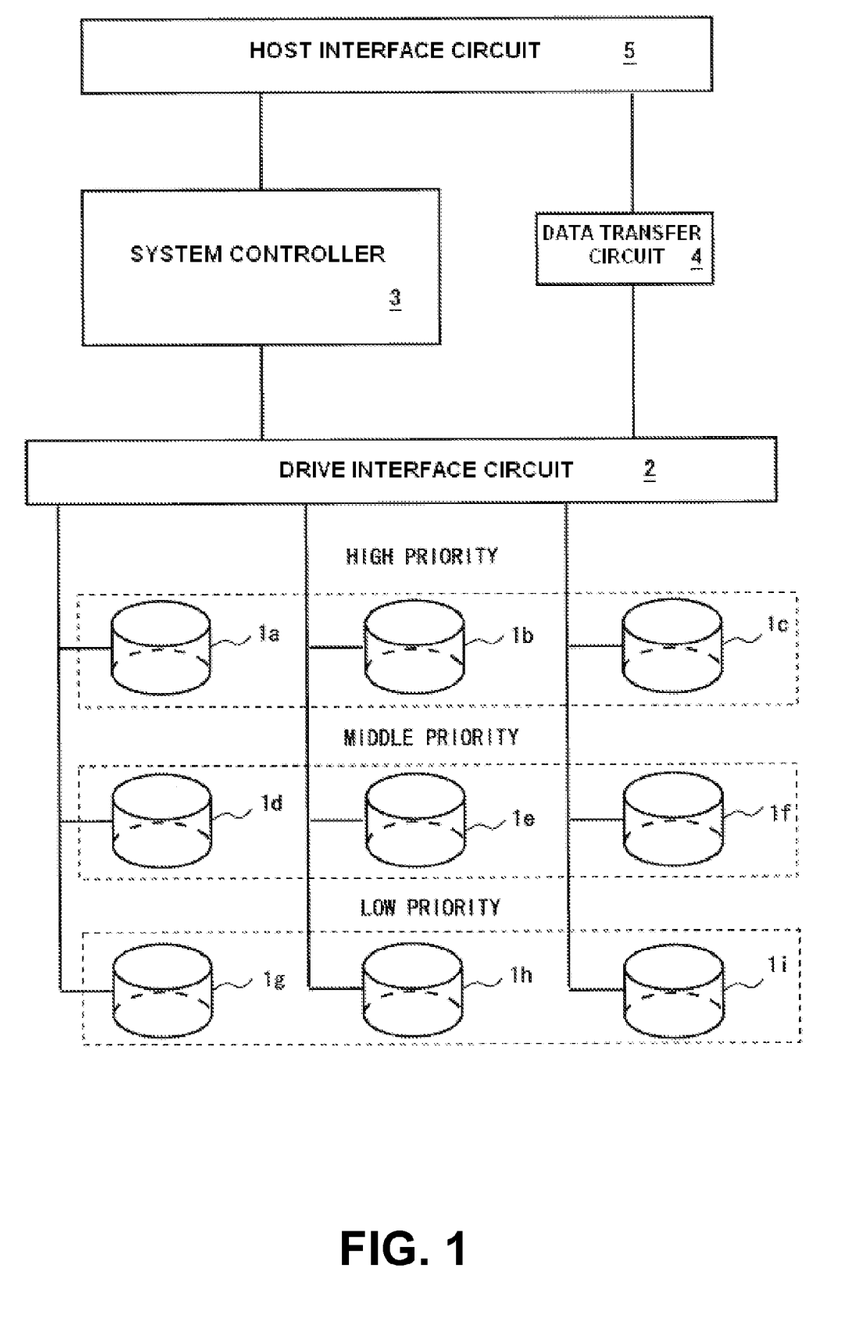
FIG. 1 is a block diagram schematically depicting the configuration of a disk array system according to an embodiment of the present invention.

FIG. 1 is a block diagram schematically illustrating the configuration of a disk array system according an embodiment of the present invention. In the example of FIG. 1, a host 6 issues a command to the disk array system to read/write data. The disk array system comprises a host interface circuit 5, a system controller 3, a data transfer circuit 4, a drive interface circuit 2 and a plurality of HDDs 1a to 1i.

The system controller 3 receives a command from the host 6 through the host interface circuit 5 and controls each element in the disk array system to control read operations from and write operations to the HDD 1a to the HDD 1i. In write operations, data from the host 6 are written to the HDD 1a to the HDD 1i through the drive interface circuit 2 and the transfer circuit 4. In read operations, user data read from the HDD 1a to the HDD 1i are transferred to the host 6 through the drive interface circuit 2 and the transfer circuit 4.

The HDD 1a through the HDD 1i are connected to one another to configure a RAID system. In the configuration of FIG. 1, the HDD 1a through the HDD 1c constitute a RAID group and the HDD 1d to the HDD 1f constitute another RAID group. Further, the HDD 1g through the HDD 1i constitute another RAID group. The system controller 3 divides user data transferred from the host 6 into a plurality of data blocks (striping) and stores them to respective HDDs in a RAID group.

In one embodiment, each RAID group is assigned a priority level. Specifically, the RAID group of the HDD 1a to the HDD 1c can be provided with high priority. The RAID group of the HDD 1d through the HDD 1f can be provided with middle priority. The RAID group of the HDD 1g through the HDD 1i can be provided with low priority. User data transferred from the host 6 are accompanied by a priority level and they are stored to a RAID group with a priority level to match the priority level.

In one embodiment, either the system controller 3 or the host 6 may determine which priority level RAID group stores user data. In the configuration example of FIG. 1, one priority level is assigned to one RAID group. Instead, one priority level may be assigned to a plurality of RAID groups. User data may be stored to a RAID group with the same priority level as the user data, or the may be stored to a RAID group with the same level as or a higher level than the level of the user data.

In one embodiment, the HDD 1a through the HDD 1i have their respective spin-up mode settings according to their priority levels. Spin-up is an operation to increase rotational speed of the spindle motor (magnetic disk) in a HDD to a rotational speed for data access. In one embodiment, the mode of spin-up from power-on and the mode of spin-up from a power save mode are settable individually in the HDD 1a through the HDD 1i. This enables appropriate spin-up control of the spindle motors according to the system in which the HDD 1a to 1i are installed.

In one embodiment, a maximum current in spin-up (spin-up current) in each of the HDD 1a to the HDD 1i can be defined in a spin-up mode. As spin-up current increases, the time to increase the rotational speed of a spindle motor to a given rotational speed is reduced. Namely, waiting time for disk access is reduced. On the other hand, the peak power increases with the spin-up current, resulting in an increased load on the system power supply.

In this way, the spin-up current in the spin-up from the power save mode is settable in addition to the spin-up from the power-on according to the priority levels of each of the HDD 1a to the HDD 1i in one embodiment. The HDD 1a to the HDD 1i are turned on in the power save mode, and the spindle motors are at stop or the rotational speed of the spindle motors is slower than the rotational speed in data access. In this way, the spin-up current in each of the spin-up from the power-on and the spin-up from the power save mode is settable. Thereby, more appropriate spin-up control of the spindle motors is accomplished according to the system in which the HDD 1a to the HDD 1i are installed.

Figure 2:
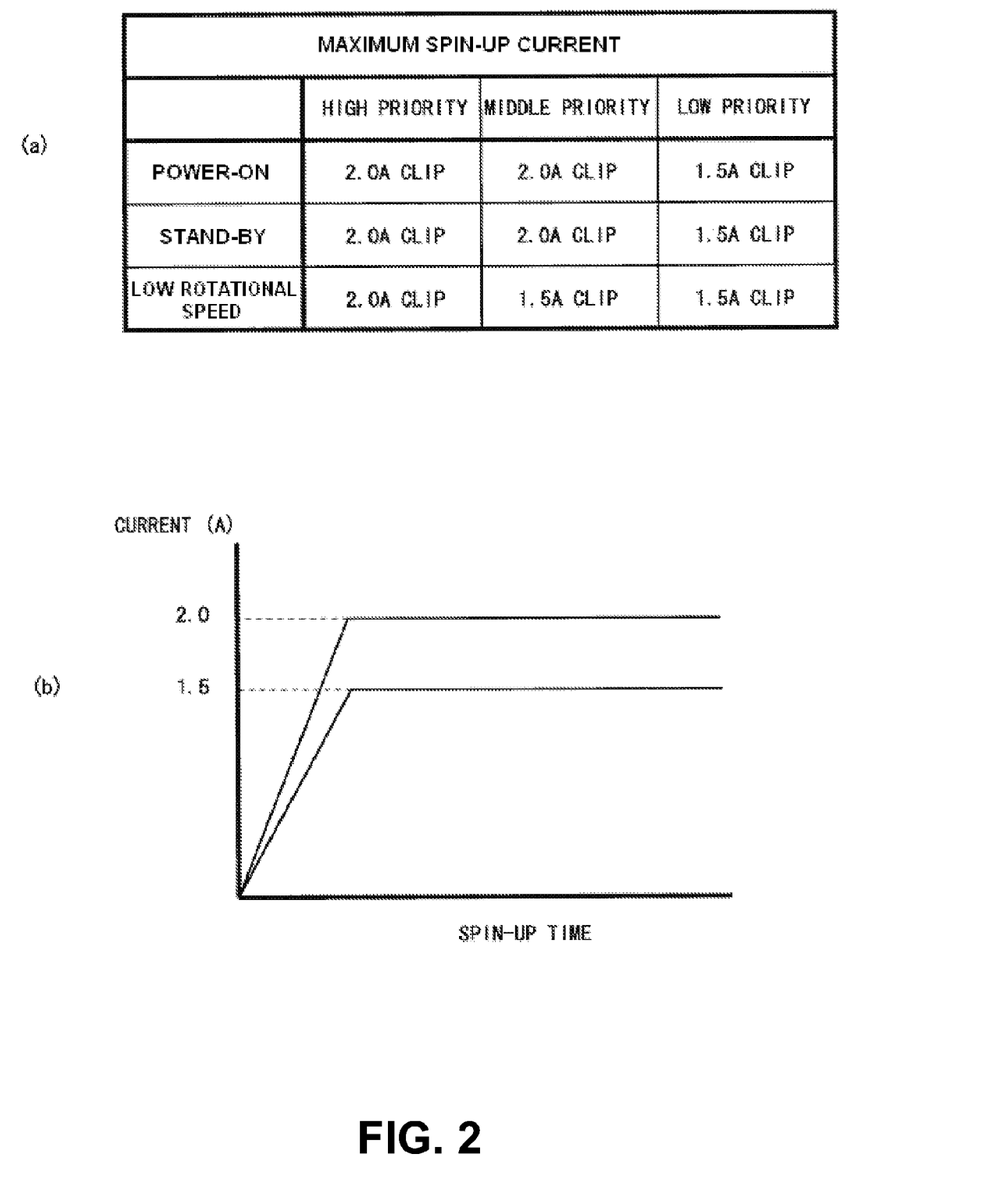
FIG. 2A is a drawing showing an example of spin-up maximum current settings of an HDD connected in a disk array system in accordance with an embodiment of the present invention.
FIG. 2B is a graph showing an example of spin-up current of HDDs connected in a disk array system in accordance with an embodiment of the present invention.

FIG. 2A and FIG. 2B schematically illustrate an example spin-up mode setting in the HDD 1a to the HDD 1i according to an embodiment of the present invention. The HDD 1a to the HDD 1i have two power save modes. The first power save mode is a stand-by mode. In the mode, the HDD 1a to the HDD 1*i* stop the rotation of the spindle motor. The second power save mode is a low rotational speed mode. The spindle motor is rotating in the mode and the rotational speed is slower than the rotational speed at which a head accesses a magnetic disk. Although the first power save mode allows more reduction in the power consumption, a HDD takes more time in the first mode from when it has started spin-up till it becomes a ready state.

In the example of FIG. 2A, two maximum spin-up currents of 2.0 A and 1.5 A are set in the HDD 1*a* to the HDD 1*i*. As shown in FIG. 2B, the magnitude of VCM current in spin-up increases drastically from 0 A to the maximum current 2.0 A or 1.5 A and then keeps the maximum current during a specific period. If the rotational speed of the spindle motor has reached a specific speed or a specific time has passed from the start of spin-up, the HDD moves to PID control and the VCM current decreases.

In the example of FIG. 2A, the HDD 1*a* to the HDD 1*c* with high priority provide the spindle motors with the maximum spin-up current of 2.0 A in all the spin-up operations from the power-on, the first power save mode and the second power save mode. On the other hand, the HDD 1*g* to the HDD 1*i* with low priority provide the spindle motors with the maximum spin-up current of 1.5 A in all the spin-up operations from the power-on, the first power save mode and the second power save mode. The HDD 1*d* to the HDD 1*f* with middle priority provide the spindle motors with the maximum spin-up current of 1.5 A in the spin-up operation from the low rotational speed mode and the maximum spin-up current of 2.0 A in the other spin-up operations.

High priority data may require high speed access. Therefore, in one embodiment, the spin-up time in HDDs storing data with higher priority be reduced and the maximum spin-up current in HDDs storing data with lower priority be reduced. It achieves the high performance of the entire system and the reduced power load. The time to become the ready state in returning from the power save mode with low rotational speed is shorter than that in the spin-up from the stopped state. Thus, the HDD 1*d* to the HDD 1*f* with middle priority provide the maximum spin-up current of 1.5 A with the spindle motor in the spin-up operation from the low rotational speed mode for high performance and reduced power load.

If an HDD has a plurality of power save modes, the maximum spin-up currents can be individually set to the power save modes and may improve the adaptability to different systems. On the other hand, from the view point of the simplicity of setting and control of HDDs, the maximum spin-up current setting may be categorized into two types of setting for the power-on and the return from power save modes, and one maximum spin-up current may be set to a plurality of power save modes.

In one embodiment of the invention, a spin-up mode has the delay time of start of spin-up as a settable variable. The HDD 1*a* through the HDD 1*i* starts the spin-up of the spindle motor after the preset delay time has passed from power-on or starting a return process from a power save mode. The spin-up start delay times settable for individual HDDs in this way allow reducing the peak current of the whole system and maintaining the performance without control by the system controller 3.

Figure 3:
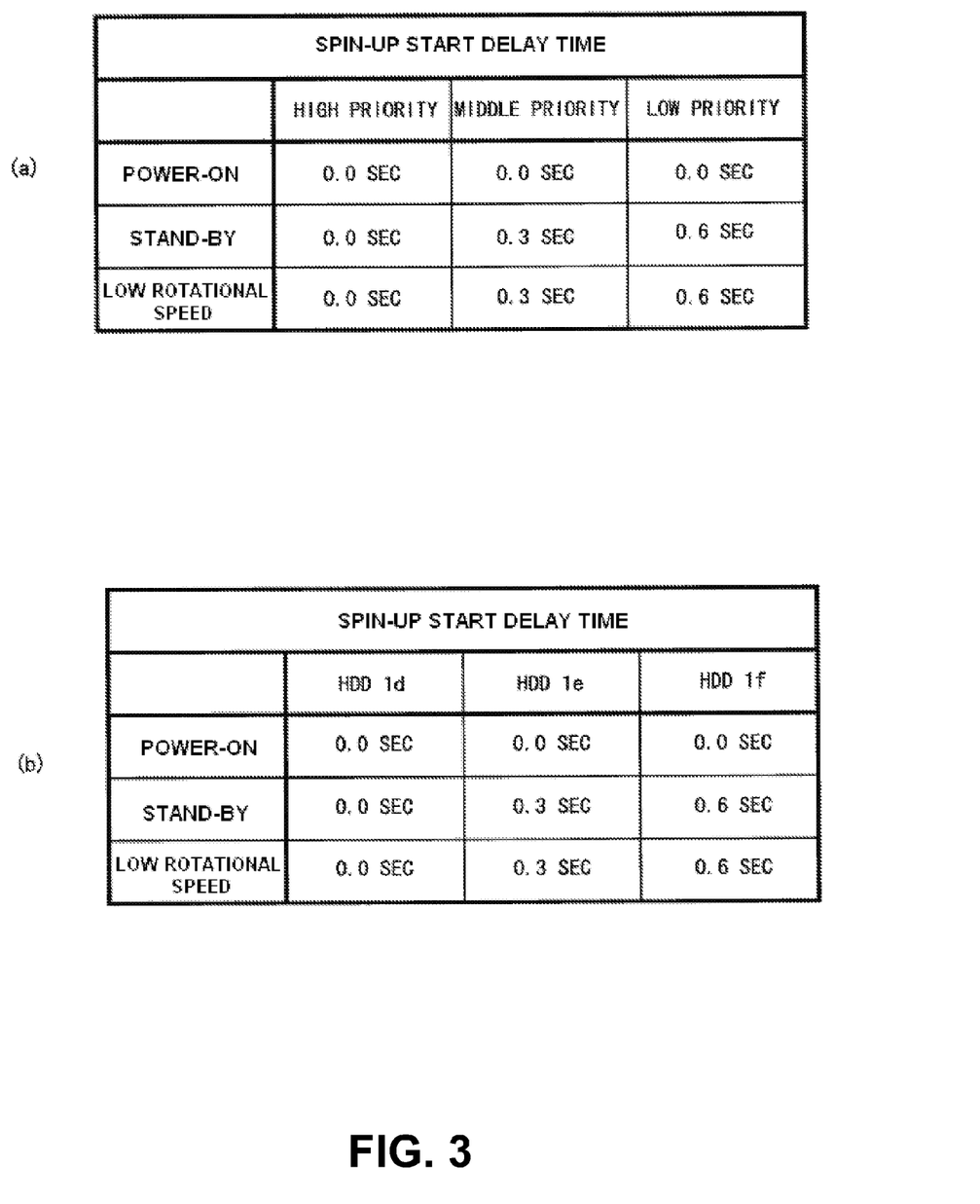
FIG. 3 shows charts depicting examples of spin-up start delay time settings in HDDs in a disk array system in accordance with an embodiment of the present invention.

FIGS. 3A and 3B show examples of spin-up start delay time settings in the HDD 1*a* through the HDD 1*i* in accordance with embodiments of the present invention. In the example of FIG. 3A, the same setting is applied to the HDDs with the same priority level. In the spin-up from power-on, the same delay time is set for all HDD 1*a* to HDD 1*i*. Specifically, in the spin-up from power-on, a delay time of 0.0 second is set in all of the HDD 1*a* to the HDD 1*i*. In the spin-up from the stand-by mode, delay times of 0.0 second, 0.3 second and 0.6 second are set in HDDs of the high-priority group, HDDs of the middle-priority group and HDDs of the low-priority group, respectively. The setting of spin-up from the power save mode with low rotational speed is the same as the spin-up from the stand-by mode.

Adjusting the spin-up start time in this way according to the priority levels of the HDD 1*a* to the HDD 1*i* is particularly effective in a system which concurrently controls the power save modes of all HDDs in the system. While reducing the peak current of the whole system, HDDs with high priority may become the ready state quickly. As shown in the setting example in FIG. 3A, an appropriate delay time is selected according to the mode of spin-up start (power-on or one of power save modes) and the priority. Different priority groups may have the same delay time setting.

In the example of FIG. 3B, the HDDs in a priority group have different delay time settings. FIG. 3B shows a setting example of the HDD 1*d* to the HDD 1*f* of the middle priority group. In the setting example, all the HDD 1*d* to the HDD 1*f* have different delay times. Setting different delay times to HDDs of a priority group allows reducing the peak current of the whole system which concurrently controls the power save modes of HDDs of a priority group. It is noted that a part of HDDs in a group may have the same delay time setting.

Figure 4:
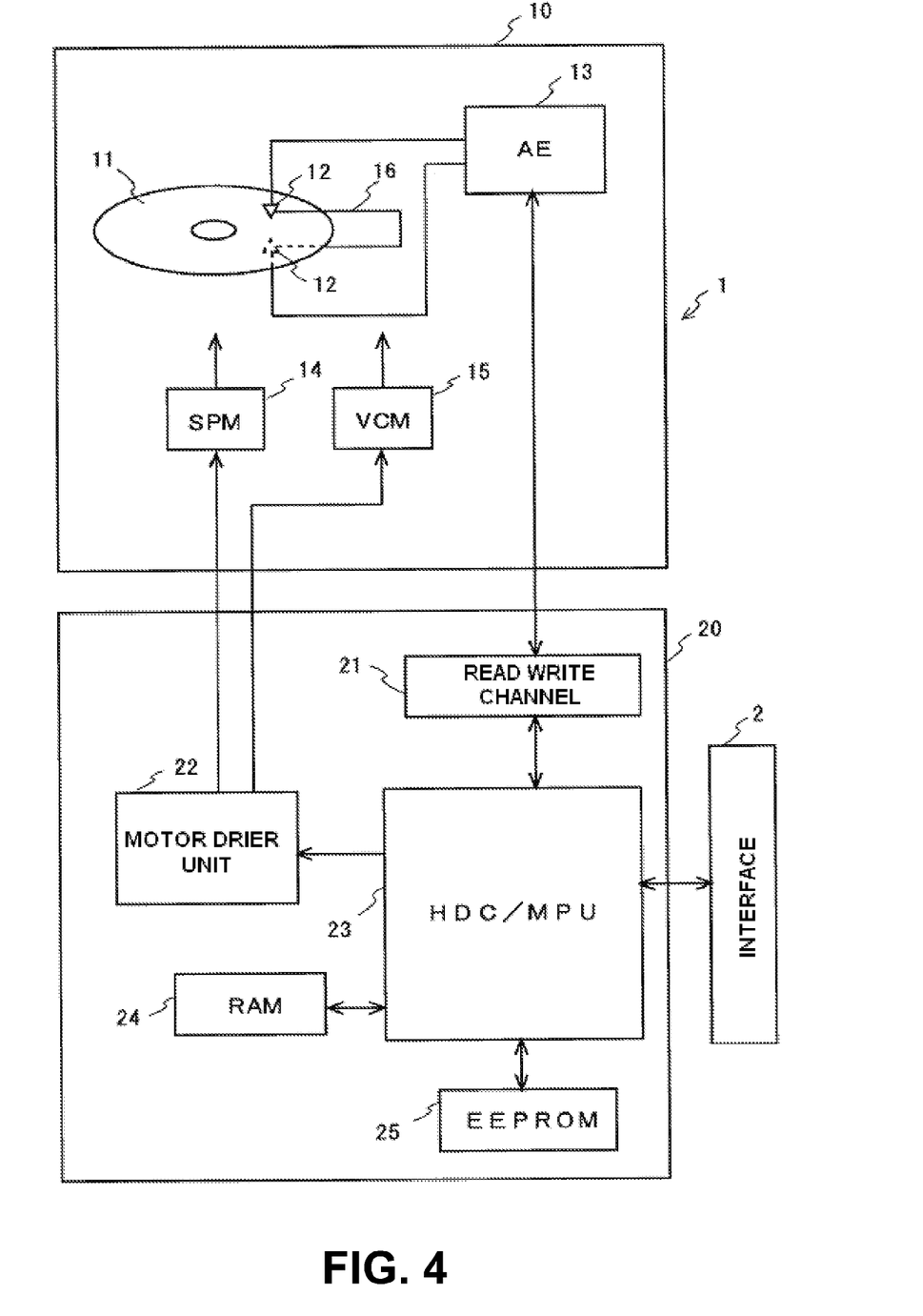
FIG. 4 is a block diagram illustrating an example configuration of a HDD according to an embodiment of the present invention.

In the HDD of the present invention, a spin-up mode may be set according to the system in which it is installed. Herein below, a spin-up mode setting method for the HDD and the operations in the HDD according to the setting will be described. FIG. 4 is a block diagram illustrating an example configuration of a HDD 1 in accordance with an embodiment of the present invention. The HDD 1 may have a circuit board 20 fixed on the outer surface of the enclosure 10. On the circuit board 20, circuit elements are mounted such as a read write channel (RW channel) 21, a motor driver unit 22, a integrated circuit of a hard disk controller, hardware, and MPU (HDC/MPU) 23 and a RAM 24.

In the enclosure 10, a spindle motor (SPM) 104 spins a magnetic disk 11 at a specific angular rate. The magnetic disk 11 is a medium for storing data. The motor driver unit 22 drives the SPM 14 according to control data from the HDC/MPU 23. Head sliders 12 each comprises a slider for flying above the magnetic disk and a head element portion secured on the slider for carrying out the conversion between magnetic signals and electric signals (reading/writing of data). The head sliders 12 are fixed at the tip end part of an actuator 16. The actuator 16 is connected to a voice coil motor (VCM) 15 and rotates on the rotational shaft to move the head sliders 12 above the spinning magnetic disk 11 along the radial direction.

The motor driver unit 22 drives the VCM 15 according to control data from the HDC/MPU 23. An arm electronics (AE) 13 selects a head slider 12 to access (read or write) the magnetic disk 11 from the plurality of head sliders 12 according to control data from the HDC/MPU 23 and amplifies read/write signals.

The RW channel 21, in a read operation, amplifies read signals supplied from the AE 13 to have specific a amplitude, extracts data from the obtained read signals, and decodes the data. The decoded data are supplied to the HDC/MPU 23. The RW channel 21, in a write operation, code-modulates write data supplied from the HDC/MPU 23, converts the code-modulated data into write signals, and then supplies them to the AE 13.

In the HDC/MPU 23, an example of a controller, the MPU operates in accordance with firmware loaded to the RAM 24 or a SRAM in the HDC from the magnetic disk 11 or an EEPROM 25. The HDC/MPU 23 controls the HDD 1 in addition to necessary processes concerning data processing such as read/write operation control, command execution order management, positioning control using servo signals (servo control), interface control to and from a host 51, defect management, and error handling when any error occurs.

In one embodiment, the HDC/MPU 23, in particular, performs the spin-up control in accordance with the setting data. Typically, the MPU performs the spin-up control in accordance with the firmware and the setting data. As aforementioned, the motor drive unit 22 supplies the SPM 14 with current to drive it. The motor drive unit 22 supplies current to the SPM 14 in accordance with control data from the HDC/MPU 23.

It may be the same in a spin-up operation of the SPM 14. The HDC/MPU 23 provides the motor drive unit 22 with data defining the spin-up profile associated with the preset spin-up mode. The motor drive unit 22 performs the spin-up of the SPM 14 in accordance with the profile.

The spin-up profile from the HDC/MPU 23 may define parameters for the feedback control of the SPM 14 and information such as the time shift to the feedback control and the rotational speed in addition to the maximum current in the spin-up. The motor drive unit 22 starts the spin-up by order of the HDC/MPU 23. The HDC/MPU 23 instructs the motor drive unit 22 to start the spin-up at the time in accordance with the delay time in the preset data.

Figure 5:
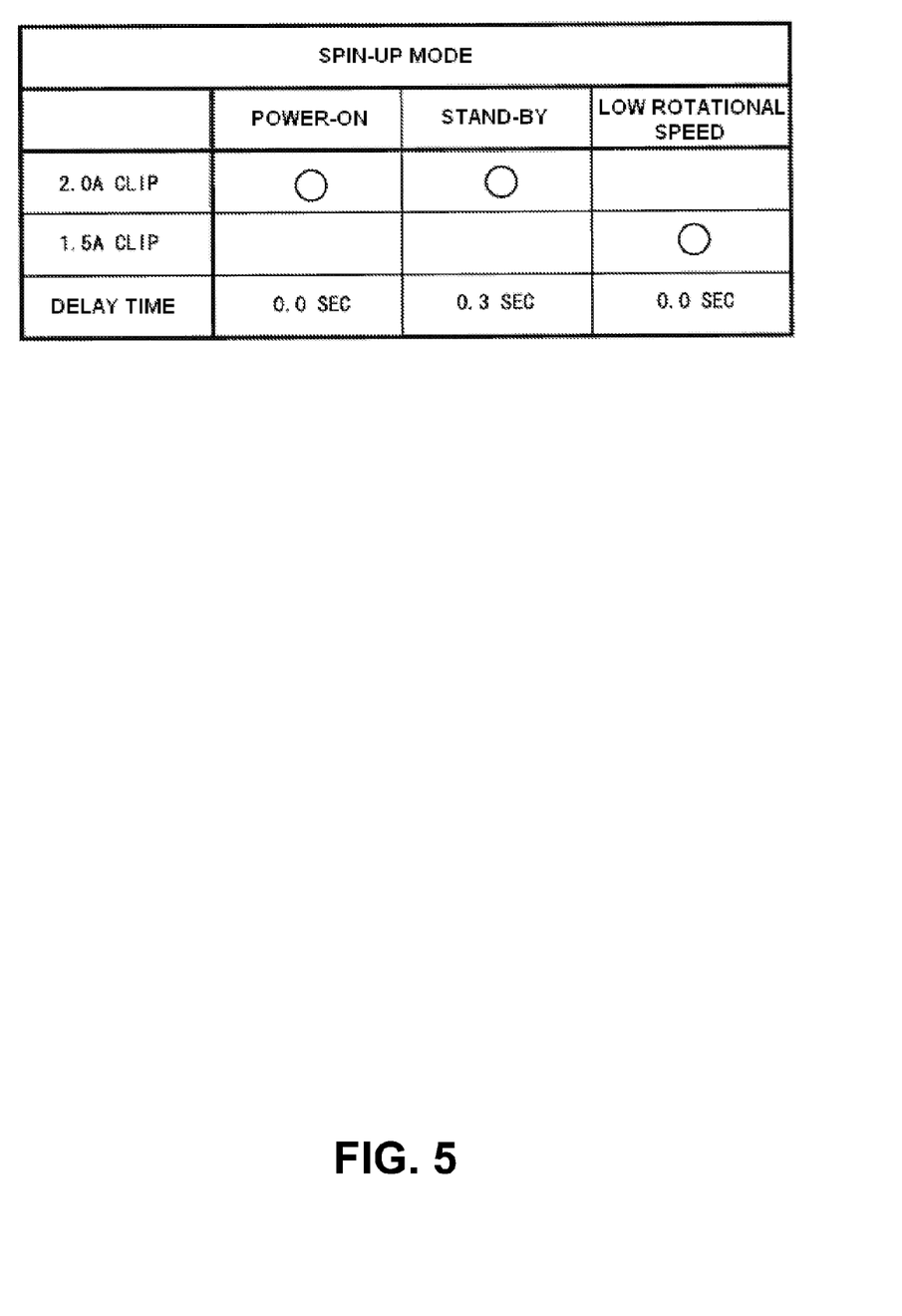
FIG. 5 is a drawing showing an example of spin-up mode settings stored in a HDD in accordance with en embodiment of the present invention.

FIG. 5 depicts an example of the preset data stored in the HDD 1 in accordance with an embodiment of the present invention. Since the HDC/MPU 23 cannot access the magnetic disk 11 before spin-up at power-on, the preset data are stored in the EEPROM 25. The HDC/MPU 23 obtains the preset data from the EEPROM 25 after power-on and stores them to the DRAM 24 or the SRAM. The example of the preset data shown in FIG. 5 specifies the spin-up maximum current and the spin-up start delay time.

The HDC/MPU 23, for spin-up after power-on, provides the motor drive unit 22 with the spin-up profile data including the current value of 2.0 A and instructs it to start the spin-up. In a spin-up operation from the low rotational speed power save mode, the HDC/MPU 23 provides the motor drive unit 22 with the spin-up profile data including the current value of 1.5 A and instructs it to start the spin-up.

In a spin-up operation from the stand-by mode, the HDC/MPU 23 waits 0.3 seconds according to the preset data of delay time and then provides the motor drive unit 22 with the spin-up profile data including the current value of 2.0 A and instructs it to start the spin-up. Instead, the HDC/MPU 23 may provide the spin-up profile in advance and then order the start of the spin-up after the delay time has passed.

In one embodiment, the HDC/MPU 23 starts the start-up operation at power-on. In the start-up operation, the HDC/MPU 23 performs the spin-up operation. In another embodiment, the HDC/MPU 23 starts return operations from the stand-by mode and the low rotational speed mode in response to a command from the system controller 3, a host device to the HDD 1. The HDC/MPU 23 instructs the motor drive unit 22 to start the spin-up the after the preset delay time has passed from receiving a command from the system controller 3. The HDC/MPU 23 shifts from the ready state to a power save mode in accordance with a command from the system controller 3.

The HDC/MPU 23 may return from or shift to a power save mode in the internal control process. For example, if a specified time has passed from the last access from the system controller 3, the HDC/MPU 23 shifts to a power save mode. If the HDC/MPU 23 receives a read or write command, it returns from the power save mode. Instead, the HDC/MPU 23 may reports the current mode to the system controller 3 beforehand and the system controller 3 may order the return from the power save mode by a command.

In one embodiment, if the HDC/MPU 23 returns from a power save mode in the internal process without a return command from the system controller 3, it starts the spin-up of the SPM 14 without delay regardless of the delay time setting. In a process which is not under the control of the system controller 3, it is difficult to synchronize it to the spin-up timings of the other HDDs so as to reduce the peak current of the system power supply. Thus, the HDC/MPU 23 performs a usual spin-up operation to avoid reduction in performance.

In this way, if the HDDs have different spin-up mode settings, in one embodiment, the system controller 3 for controlling them know the settings of the HDDs. To this end, in one embodiment, the HDC/MPU 23 reports its spin-up mode setting to the system controller 3. The HDC/MPU 23 may report it in response to a command from the system controller 3 or spontaneously in the start-up process at power-on.

The system controller 3 obtains setting data for the HDD 1a to the HDD 1i connected in the system and stores the data to a control table. The system controller 3 refers to the control table in the power control of the HDD 1a to the HDD 1i (power control in return processes from power-on and power save modes) to give instructions for the power-on operation and the return operations form the power save modes of the HDD 1a to the HDD 1i.

The spin-up mode setting of the HDD 1 can be changed before or after being installed in a system. For example, in a manufacturing step of the HDD 1, the spin-up mode is preset. A system designer selects an appropriate spin-up mode setting for the system. Otherwise, the system controller 3 instructs the HDD 1 to set the spin-up mode with a command. It allows setting a spin-up mode appropriate for the system status. In this case, the system controller 3 registers the spin-up modes of the HDDs to the control table and use it in the subsequent operations.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk drive comprising:
 an enclosure portion comprising:
  a spindle motor for spinning a disk configured for storing data; and
 a circuit board fixed to the outer surface of the enclosure portion, the circuit board having elements mounted thereon, said elements comprising:
  a nonvolatile memory fixedly coupled to said circuit board, said nonvolatile memory comprising instructions associated with a first process for spin-up of said spindle motor from a power-on mode and said nonvolatile memory comprising instructions associated with a second process for spin-up of said spindle motor from a power save mode;

a controller fixedly coupled to said circuit board, said controller for determining which of said first or said second process for spin-up of said spindle motor to implement in accordance with said instructions stored in said nonvolatile memory; and a motor driver fixedly coupled to said circuit board, said motor driver for spinning up said spindle motor according to said first process or according to said second process for spin-up of said spindle motor.

2. The disk drive according to claim 1, wherein said instructions associated with said first process for spin-up of said spindle motor from a power-on mode and said instructions associated with said second process for spin-up of said spindle motor from a power save mode define a maximum spin-up current.

3. The disk drive according to claim 1, wherein said instructions associated with said first process for spin-up of said spindle motor from a power-on mode and said instructions associated with said second process for spin-up of said spindle motor from a power save mode define a spin-up delay start time.

4. The disk drive according to claim 1, wherein said controller reports which of said first or said second process for spin-up of said spindle motor has been determined to a host.

5. The disk drive according to claim 1, wherein said controller is further configured to perform said determining based on a command from a host.

6. The disk drive according to claim 1, wherein
in said power save mode, said spindle motor of said disk drive is stopped.

7. The disk drive according to claim 1, wherein
in said power save mode, a rotational speed of said spindle motor of said disk drive is reduced.

8. A disk array system comprising:
a plurality of disk drives comprising:
  an enclosure portion comprising:
    a spindle motor for spinning a disk configured for storing data; and
    a circuit board fixed to the outer surface of the enclosure portion, the circuit board having elements mounted thereon, said elements comprising:
    a nonvolatile memory fixedly coupled to said circuit board, said nonvolatile memory storing instructions associated with a first process for spin-up of at least one spindle motor associated with said plurality of disk drives from a power-on mode and said nonvolatile memory for storing instructions associated with a second process for spin-up of at least one spindle motor associated with said plurality of disk drives from a power save mode;
  a controller fixedly coupled to said circuit board of each of said plurality of disk drives, said controller determining which of said first or said second process for spin-up of at least one spindle motor of said plurality of disk drives to implement in accordance with said instructions stored in said nonvolatile memory; and
  a motor driver fixedly coupled to said circuit board, said motor driver spinning up at least one spindle motor associated with said plurality of disk drives according to said first process or according to said second process for spin-up of said at least one spindle motor; and
a system controller for dividing user data and instructing the plurality of disk drives to store the divided user data.

9. The disk array system to claim 8, wherein said controller is configured to modify spin-up timings at power-on of the plurality of disk drives.

10. The disk array system according to claim 8, wherein a maximum spin-up current is defined for each of said first and said second processes.

11. The disk array system according to claim 10, wherein
said system controller divides the plurality of disk drives into a plurality of groups to store data, and
wherein a maximum current can be defined for each of the plurality of groups.

12. The disk array system according to claim 8, wherein a spin-up delay start time is defined for each of the plurality of groups.

13. The disk array system according to claim 8, wherein
said plurality of disk drives reports a determined spin-up mode from the power-on and a determined spin-up mode from the power save mode to the system controller,
said system controller manages said spin-up modes of said plurality of disk drives, and
return from said power save mode in the plurality of disk drives is controlled according to said spin-up modes of the plurality of disk drives.

14. A method for controlling a disk drive comprising:
a disk drive comprising:
  an enclosure portion comprising:
    a spindle motor for spinning a disk; and
    a circuit board fixed to the outer surface of the enclosure portion, the circuit board having elements mounted thereon, said elements comprising:
    a nonvolatile memory fixedly coupled to said circuit board, said nonvolatile memory comprising instructions associated with a first process for spin-up of said spindle motor from a power-on mode and said nonvolatile memory comprising instructions associated with a second process for spin-up of said spindle motor from a power save mode;
    a controller fixedly coupled to said circuit board, said controller for determining which of said first or said second process for spin-up of said spindle motor to implement in accordance with said instructions stored in said nonvolatile memory; and
    a motor driver fixedly coupled to said circuit board, said motor driver for spinning up said spindle motor according to said first process or according to said second process for spin-up of said spindle motor;
determining whether a disk drive is in a power on mode or a power save mode;
accessing said nonvolatile memory;
determining which of said first or said second process for spin-up of said spindle motor to implement in accordance with said instructions stored in said nonvolatile memory; and
spinning up said spindle motor according to said first process or according to said second process.

* * * * *